US012620645B2

(12) United States Patent
Shukla et al.

(10) Patent No.: US 12,620,645 B2
(45) Date of Patent: May 5, 2026

(54) EMERGENCY LIGHTING DRIVER AND OPERATION METHOD THEREOF

(71) Applicant: Tridonic GmbH & Co KG, Dornbirn (AT)

(72) Inventors: Jagjitpati Shukla, Durham (GB); Deepak Makwana, New Castle Upon Tyne (GB)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 19/112,688

(22) PCT Filed: Sep. 25, 2023

(86) PCT No.: PCT/EP2023/076433
§ 371 (c)(1),
(2) Date: Mar. 18, 2025

(87) PCT Pub. No.: WO2024/068566
PCT Pub. Date: Apr. 4, 2024

(65) Prior Publication Data
US 2026/0088386 A1    Mar. 26, 2026

(30) Foreign Application Priority Data
Sep. 30, 2022    (EP) ..................................... 22198998

(51) Int. Cl.
H01M 10/63        (2014.01)
F21V 23/02        (2006.01)
                (Continued)

(52) U.S. Cl.
CPC ........... H01M 10/63 (2015.04); F21V 23/023 (2013.01); H01M 10/4285 (2013.01);
                (Continued)

(58) Field of Classification Search
CPC .. H01M 10/63; H01M 10/4285; H01M 10/48; H01M 10/486; H01M 10/65; H01M 6/50; H01M 6/5038; F21V 23/023
See application file for complete search history.

(56) References Cited

U.S. PATENT DOCUMENTS 8,858,006 B2 *  10/2014  Lee ......................... F21S 9/022
                                                            315/86
2008/0191628 A1 *  8/2008  Marques ................ H05B 47/29
                                                            315/86
                (Continued)

FOREIGN PATENT DOCUMENTS

WO          2019175555 A1      9/2019

OTHER PUBLICATIONS

PCT/EP2023/076433, International Search Report and Written Opinion, dated Nov. 29, 2023, 6 pages.

*Primary Examiner* — Tracie Y Green
*Assistant Examiner* — Michael Chiang
(74) *Attorney, Agent, or Firm* — Andrus Intellectual Property Law, LLP

(57) ABSTRACT

An emergency driver (100) of this disclosure for driving emergency lighting means comprises a battery (101) operably coupled to the emergency lighting means, a preferably resistive temperature sensor (104) configured to generate a temperature signal (Ts) corresponding to a temperature of the battery (101), at least a resistive heating element (102) configured to increase the temperature of the battery (101) by a heating operation, and a controller (106) configured to perform in a time multiplex manner, the reading of the temperature sensor (104) and the operation of the resistive heating element (102).

18 Claims, 5 Drawing Sheets

100

(51) Int. Cl.
  *H01M 10/42*        (2006.01)
  *H01M 10/48*        (2006.01)
  *H01M 10/615*       (2014.01)
  *H01M 10/6571*      (2014.01)

(52) U.S. Cl.
  CPC ....... *H01M 10/486* (2013.01); *H01M 10/615*
        (2015.04); *H01M 10/6571* (2015.04)

(56)                    References Cited

U.S. PATENT DOCUMENTS

| | | | |
|---|---|---|---|
| 2010/0264737 A1 * | 10/2010 | Chandler | H05B 45/18 |
| | | | 307/66 |
| 2017/0047774 A1 * | 2/2017 | Rezeanu | H02J 7/0013 |
| 2019/0112755 A1 | 4/2019 | Izard | |

* cited by examiner

400

500

EMERGENCY LIGHTING DRIVER AND OPERATION METHOD THEREOF

CROSS REFERENCE TO RELATED APPLICATIONS

The present application is the U.S. national stage application of international application PCT/EP2023/076433 filed Sep. 25, 2023, which international application was published on Apr. 4, 2024 as International Publication WO 2024/068566 A1. The international application claims priority to European Patent Application No. 22198998.1 filed Sep. 30, 2022.

TECHNICAL FIELD OF THE INVENTION

The present disclosure relates to an emergency driver for driving emergency lighting means, and more particularly, to an emergency driver for driving emergency lighting means that can perform both the temperature sensing and heating of the battery provided therein in a time multiplexed manner.

BACKGROUND OF THE INVENTION

Generally, charging a Lithium battery under sub-zero temperatures should be avoided due to a chemical phenomenon called "Lithium Plating", which may be caused by the charge current forcing the lithium ions to move at a faster reaction rate than usual and accumulate on the surface of the anode. Emergency driver applications for driving, especially outdoor emergency lights or in other demanding industrial applications, may be affected by the phenomenon when attempted to charge the battery therein under sub-zero or at low temperatures.

One possible solution to charge the battery under sub-zero temperatures is to embed a heating element around the battery to rise the temperature of the battery to an acceptable temperature when the charging should be started. However, the additional circuitry, especially the additional terminals that may require to supply the heating element, may increase the overall size of the circuitry as well as may raise the complexity of packaging and production of emergency drivers, especially due to the extended number of wire connections or supply terminals.

SUMMARY OF THE INVENTION

In view of the above, embodiments of this disclosure aim to provide an emergency driver for driving emergency lighting means, such as LED lighting means, an emergency lighting system, and an operation method. An objective is to provide an emergency lighting means driving scheme that can perform both the temperature sensing and heating of the battery provided therein, especially in a compact (i.e., size or area constrain) and a simplified (i.e., connection, packaging, or production complexities) manner.

These and other objectives are achieved by the embodiments of this disclosure as described in the enclosed independent claims. Advantageous implementations of the embodiments are further defined in the dependent claims.

According to a first aspect of this disclosure, an emergency driver is provided for driving emergency lighting means. The emergency driver comprises a battery operably coupled to the emergency lighting means, a preferably resistive temperature sensor configured to generate a temperature signal corresponding to a temperature of the battery, at least a resistive heating element configured to increase the temperature of the battery by a heating operation, and a controller configured to perform in a time multiplex manner, the reading of the temperature sensor and the operation of the resistive heating element. Advantageously, the heating operation to increase the battery temperature and the reading of the temperature sensor can be performed in a multitasking fashion to detect the battery temperature as well as to provide supply power to the battery heating element.

In an implementation form of the first aspect, the controller is configured to read the temperature signal generated by the temperature sensor to measure the temperature of the battery in a first cycle or temperature sensing phase, and further to provide a controlled voltage to the resistive heating element for the heating operation based on the measured temperature of the battery in a following second cycle or battery heating phase.

In this regard, the temperature sensing phase and the battery heating phase can be performed in any order required by an application. For instance, the controller may first initiate the temperature sensing phase to measure the battery temperature and in the following battery heating phase, the controller may accordingly supply a controlled power to the battery heating element for the heating operation. Alternatively, the controller may first initiate the battery heating phase to supply the controlled power to the battery heating element for the heating operation, and in the following temperature sensing phase, the controller may measure the battery temperature.

In an implementation form of the first aspect, the temperature sensor and the resistive heating element are operably coupled to a common terminal, whereby the controller is configured to read the temperature signal from the common terminal in the first cycle and further to provide the controlled voltage to the common terminal in the second cycle. Advantageously, the number of required terminals or wire connections, especially for heating the battery in addition to the temperature sensing, can be limited to a single common terminal for both operations.

In an implementation form of the first aspect, the temperature sensor and the resistive heating element are coupled along a single electrical path with respect to the common terminal. Advantageously, reading of the temperature signal from the temperature sensor and powering the battery heating element, especially at the common terminal, can be performed in a simplified manner via the single electrical path.

In an implementation form of the first aspect, the emergency driver further comprises means for bypassing the temperature sensor, whereby the controller is configured to bypass the temperature sensor in the second cycle. Advantageously, the temperature sensor can be selectively bypassed especially during the battery heating phase, thereby facilitating an effective heating operation by means of the single common terminal.

In an implementation form of the first aspect, the emergency driver further comprises a first switching element and a second switching element, whereby the controller is configured to operate the first switching element and the second switching element in a complementary manner, wherein a conduction period of the first switching element corresponds to the first cycle and a conduction period of the second switching element corresponds to the second cycle.

In other words, the first switching element may be switched on and the second switching element may be switched off to initiate the temperature sensing phase so as to configure the temperature sensor to generate the temperature signal corresponding to the temperature of the battery.

Afterwards, the first switching element may be switched off and the second switching element may be switched on to initiate the battery heating phase, especially for supplying the battery heating element and bypassing the temperature sensor.

In an implementation form of the first aspect, the controller is configured to operate the first switching element and the second switching element in the complementary manner with a fixed frequency. For example, the controller may operate the first switching element and the second switching element in the complementary fashion, especially in a pulse-width modulation (PWM) mode with a fixed frequency of 500 Hz.

In an implementation form of the first aspect, the controller is configured to control the conduction period or duty cycle of the second switching element based on a predetermined temperature of the battery. In other words, the controller may control the duration of the battery heating phase in time based on a measured temperature of the battery, or in order to adjust the heating power, or based on a temperature of the battery suitable to initiate the charging operation of the battery, or a combination thereof.

In an implementation form of the first aspect, the first switching element and the second switching element are active switching elements, preferably transistors. More preferably, the first switching element and the second switching element are field-effect transistors (FETs). Advantageously, for instance, pulse-based complementary operations of the switching elements can be effectively performed.

In an implementation form of the first aspect, the controller is configured to read the temperature signal generated by the temperature sensor during the first cycle at a predetermined delay in time after the initiation of the first cycle. Advantageously, the delay or dead time in-between the battery heating phase and the temperature sensing phase may avoid any overlap of the phases, especially allowing the effective reading of the temperature signal from the temperature sensor after a preceding battery heating operation.

In an implementation form of the first aspect, the controller is configured to average the measured temperature of the battery based on the temperature signal generated by the temperature sensor over a predetermined number of cycles. This may advantageously facilitate a stable reading of the temperature sensor.

In an implementation form of the first aspect, the battery is a Lithium-ion battery. Alternatively, the battery may be a Nickel-metal hybrid (NiMH) type battery.

In an implementation form of the first aspect, the temperature sensor is a thermistor. Preferably, the temperature sensor is a negative temperature coefficient (NTC) thermistor.

According to a second aspect of this disclosure, an emergency lighting system is provided. The emergency lighting system comprises the emergency driver according to the first aspect of this disclosure, emergency lighting means operably coupled to the emergency driver, and a housing encompassing the emergency driver and the emergency lighting means, the housing being mountable relative to a wall or a surface.

According to a third aspect of this disclosure, a method is provided for a time-multiplexed resistive heating and preferably resistive temperature sensing of the battery for the emergency driver of the first aspect. The method comprises the steps of generating a temperature signal corresponding to a temperature of the battery and measuring the temperature of the battery based on the temperature signal in a first cycle, and providing a controlled voltage to increase the temperature of the battery by a heating operation based on the measured temperature of the battery in a following second cycle.

In an implementation form of the third aspect, the method further comprises the step of reading the temperature signal from and providing the controlled voltage to a common terminal of the emergency driver.

It is to be noted that the emergency lighting system according to the second aspect and the method according to the third aspect correspond to the emergency driver according to the first aspect and its implementation forms. Accordingly, the emergency lighting system of the second aspect and the method of the third aspect may have corresponding implementation forms. Further, the emergency lighting means of the second aspect and the method of the third aspect achieve the same advantages and effects as the emergency driver of the first aspect and its respective implementation forms.

BRIEF DESCRIPTION OF THE DRAWINGS

The above described aspects and implementation forms will be explained in the following description of specific embodiments in relation to the enclosed drawings, in which.

DETAILED DESCRIPTION OF THE EXEMPLARY EMBODIMENTS

Reference will now be made in detail to the embodiments of the present disclosure, examples of which are illustrated in the accompanying drawings. However, the following embodiments of the present disclosure may be variously modified and the range of the disclosure is not limited by the following embodiments. Reference signs for similar entities in different embodiments are partially omitted.

Figure 1:
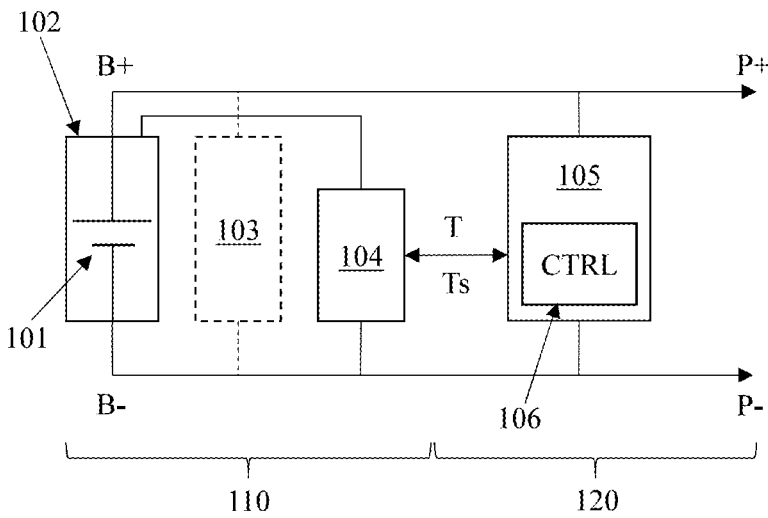
FIG. 1 shows an exemplary block representation of an emergency driver according to an embodiment of this disclosure.

In FIG. 1, an exemplary block representation of an emergency driver 100 according to an embodiment of this disclosure is illustrated. The emergency driver 100 may comprise a battery or a battery system or unit 101 to provide supply to the emergency lighting means (not shown). The terminals B+ and B− may denote the battery terminals and the terminals P+ and P− may denote the post protection battery terminals. The emergency driver 100 may further comprise a heating element or a battery heating element 102, preferably a resistive heating element, positioned at or around the battery 101 to heat up the battery 101 when supplied with a voltage, i.e. to increase a temperature of the battery 101 e.g. via thermal conduction. The heating element 102 may have a predefined or fixed voltage and/or current rating.

The emergency driver 100 may optionally comprise protection circuitry 103 operably coupled to the battery 101, and may be configured for the protection of the battery under short-circuit, over-charge, over-discharge, and the like. However, if the battery is a NiMH type battery, the protection circuitry 103 may be omitted. The emergency driver 100 may further comprise a temperature sensor 104, preferably a resistive temperature sensor, especially positioned at or near the battery 101 adequate for sensing the battery temperature. As such, the temperature sensor 104 may generate a temperature signal Ts corresponding to the battery temperature, e.g. sensing current, at a given instant.

In this regard, the battery 101, the heating element 102, the optional protection circuitry 103, and the temperature sensor 104 may be collectively referred as the protection segment 110 of the emergency driver 100, which is commonly known as a protection control module (PCM) for Lithium batteries.

The emergency driver 100 may further comprise driving circuitry 105 for driving the emergency lighting means, e.g. a LED driver, and additionally for operating and/or controlling the heating element 102 and the temperature sensor 104. The driving circuitry 105 may comprise a controller 106 configured to perform the reading of the temperature sensor 104 and the operation of the heating element 102 in a time multiplexed manner.

The controller 106 may comprise or be one or more application specific integrated circuits (ASICs), programmable logic devices (PLDs), field programmable gate arrays (FPGAs), microcontrollers, or the like. The driving circuitry 105 along with the controller 106 may be collectively referred as the driver segment 120 of the emergency driver 100.

In this regard, the controller 106 may read the temperature signal Ts generated by the temperature sensor 104 to measure the temperature of the battery 101 in a first cycle or in a temperature sensing phase of the operation, and further to provide a controlled voltage to the resistive heating element 102 for the heating operation, especially based on the measured temperature of the battery 101 in a following second cycle or in a battery heating phase of the operation.

It is to be noted that the temperature sensor 104 and the resistive heating element 102 are preferably coupled to a common terminal T, where the controller 106 may be configured to read the temperature signal Ts from the common terminal T during the temperature sensing phase and further to provide the controlled voltage to the common terminal T during the battery heating phase.

Figure 2:
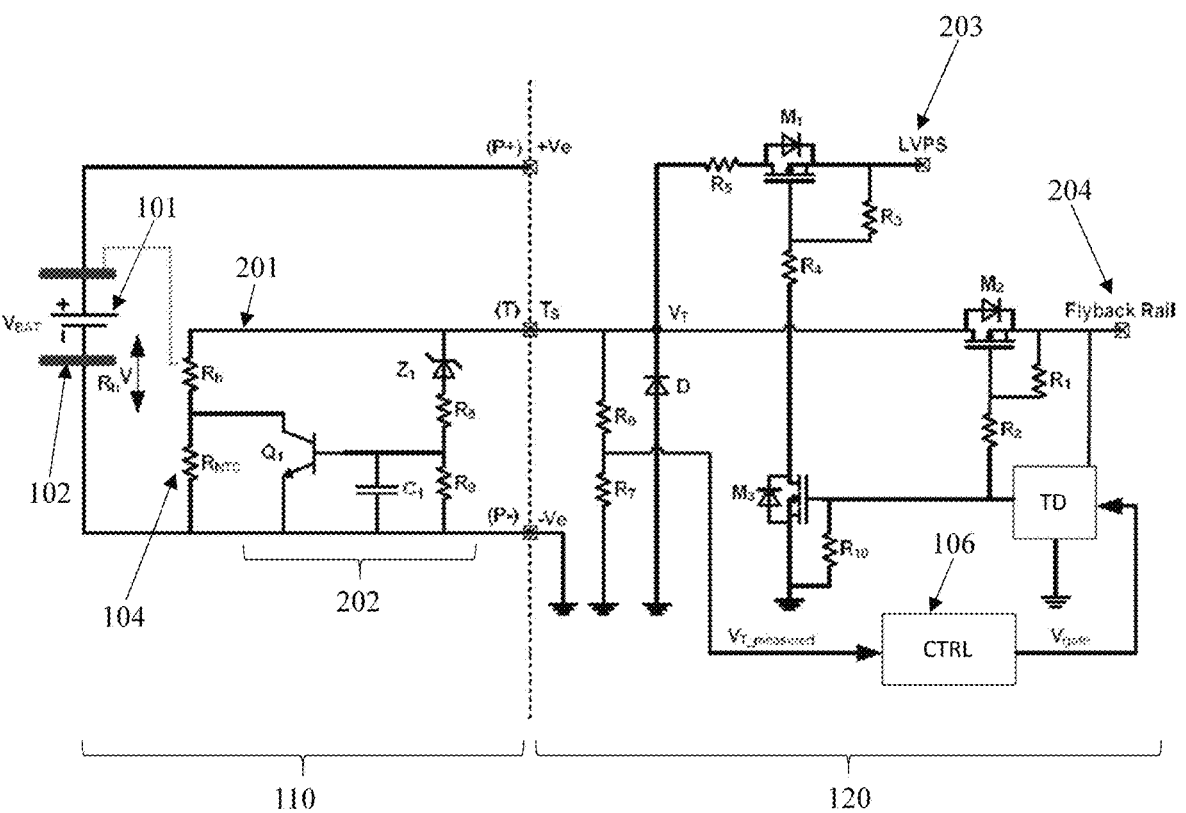
FIG. 2 shows an exemplary circuital representation of the emergency driver according to an embodiment of this disclosure.

In FIG. 2, an exemplary circuital representation of the emergency driver 100 according to an embodiment of this disclosure is illustrated. Particularly, the exemplary circuital representation may correspond to the equivalent electrical circuital representation of the emergency driver 100. The left side of the exemplary representation may correspond to the equivalent electrical circuital representation realized within the protection segment of PCM 110 of the emergency driver 100, and the right side of the exemplary representation may correspond to the equivalent electrical circuital representation realized within the driver segment 120 of the emergency driver 100.

For example, the battery 101 may be coupled to the post protection battery terminals P+, P−, and the heating element 102 may be arranged around the battery 101. The equivalent resistance of the heating element 102 is denoted as $R_h$, whereas the equivalent resistance of the temperature sensor is denoted as $R_{NTC}$. The resistors $R_h$ and $R_{NTC}$ may be coupled to the common terminal T especially in a series connection. A bypass circuitry 202 may be further provided between the resistors and the common terminal T, especially to bypass the $R_{NTC}$ during the battery heating phase. The bypass circuitry 202 may comprise a transistor $Q_1$ that may be driven by a Zener diode $Z_1$ having a predefined or fixed reverse voltage rating or threshold, especially in the reverse-mode to act as a voltage controller.

For instance, if the voltage at the common terminal T is above the threshold voltage of the Zener diode $Z_1$, the transistor $Q_1$ receives the maximum amount of base current to operate in the saturation region, i.e. switching the transistor $Q_1$ fully-ON, thereby effectively bypassing the temperature sensor $R_{NTC}$. However, if the voltage at the common terminal T is below the threshold voltage of the Zener diode $Z_1$, the transistor $Q_1$ receives zero base current to operate in the cut-off region, i.e. switching the transistor $Q_1$ fully-OFF, and the resistors remain in series with respect to the common terminal T.

Furthermore, the time multiplexed operation of the resistors $R_h$ and $R_{NTC}$ may be realized by means of two transistors $M_1$ and $M_2$, which may be operated by the controller 106 by means of a transistor driver TD in a complementary fashion in PWM mode. For example, the controller 106 may provide a gate voltage $V_{gate}$ to the transistor driver to control the conduction times or duty cycles of the transistors $M_1$ and $M_2$.

For instance, the transistors $M_1$ and $M_2$ are P-channel Enhancement-type MOSFETs, and the transistor driver is directly connected to the gate of the $M_2$ to drive the transistor $M_2$, whereas the driver is connected to the gate of the $M_1$ via a third transistor $M_3$, especially a N-channel Enhancement-type MOSFET, to drive the transistor $M_1$ in a complementary manner.

For example, a negative (i.e. less than 0V) gate signal provided by the transistor driver TD may be applied at the gates of the $M_2$ and $M_3$, where the $M_2$ conducts and the $M_3$ remains switched off. Alternatively, a positive (i.e. greater than 0V) gate signal provided by the transistor driver TD may be applied at the gates of the $M_2$ and $M_3$, where the $M_3$ conducts and the $M_2$ remains switched off, thereby conducting $M_1$ via $M_3$. As such, the transistors $M_1$ and $M_2$ can be operated in a cyclic or switching manner to provide a supply voltage for the heating operation and a sensing voltage for the temperature sensing at the common terminal T in the cyclic or switching manner.

In the following, an exemplary operation of the emergency driver 100 is described to realize the time multiplexed operation of the heating element 102 and the temperature sensor 104. The transistor $M_2$ may be coupled to a flyback rail voltage 204 of 13.5V and the transistor $M_1$ may be coupled to a low voltage power supply or a reference voltage 203 of 3.3V. A free-wheeling or flyback diode D may be provided at the common terminal T to avoid voltage spikes across the transistors $M_1$ and $M_2$ due to stray inductance that may be present in series with the heating element $R_h$.

To initiate the temperature sensing phase, the controller 106, via the transistor driver TD and the transistor $M_3$, switches on the transistor $M_1$ and switches off the transistor $M_2$. The reference voltage 203 is therefore applied at the common terminal T via a pull-up resistor $R_5$. The Zener diode $Z_1$ has a threshold of 5.6V, and since the reference voltage 203 at the terminal T is lower than the threshold of the Zener diode $Z_1$, the transistor $Q_1$ turns off. Hence, the reference voltage 203 is applied across the combined resistance of the heating element $R_h$ and the temperature sensor $R_{NTC}$. Under this condition, the voltage developed at the common terminal T is a function of the value of the resistor $R_{NTC}$, and therefore is read ($V_{T\_measured}$) by the controller 106 via a resistor divider formed by the resistors $R_6$ and $R_7$, especially to determine the current battery temperature.

To initiate the battery heating phase, the controller 106, via the transistor driver TD and the transistor $M_3$, switches on the transistor $M_2$ and switches off the transistor $M_1$, and hence the flyback rail voltage 204 is applied at the common terminal T. Since the flyback rail voltage 204 at the terminal T is higher than the threshold of the Zener diode $Z_1$, the transistor $Q_1$ remains on and the resistor $R_{NTC}$ is bypassed by the transistor $Q_1$. In this condition, the flyback rail voltage 204 is directly applied to the heating element $R_h$ for the heating operation.

Figure 3:
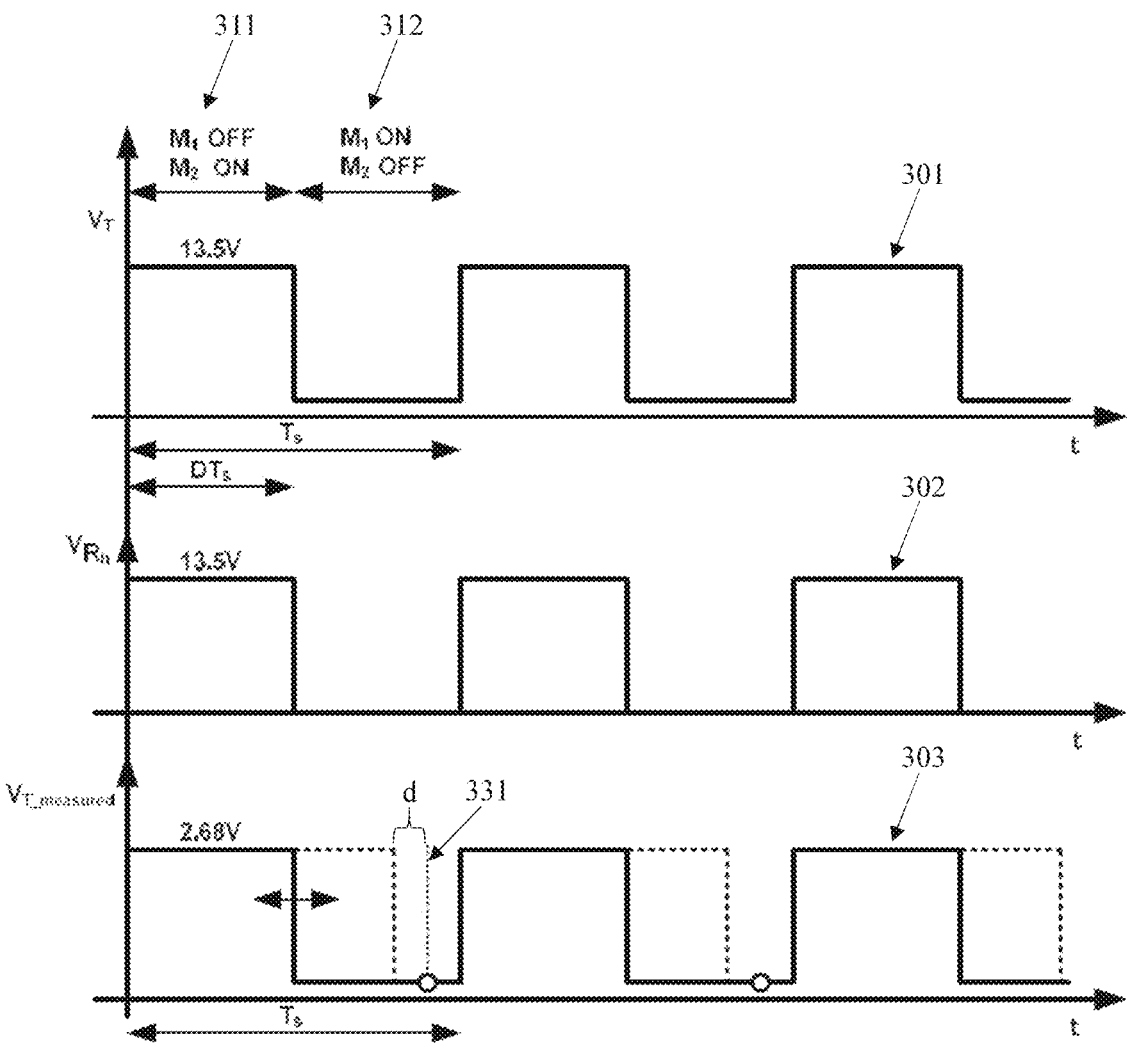
FIG. 3 shows exemplary timing operations for time multiplexed heating and temperature sensing according to an embodiment of this disclosure.

FIG. 3 shows exemplary timing operations for time multiplexed heating and temperature sensing according to an embodiment of this disclosure. The graph 301 shows the voltage $V_T$ at the common terminal T during an exemplary battery heating phase 311 and an exemplary temperature sensing phase 312 over time t. It can be seen that, during the battery heating phase, the transistor $M_1$ is switched-off and the transistor $M_2$ is switched-on, whereas during the temperature sensing phase, the transistor $M_1$ is switched-on and the transistor $M_2$ is switched-off. During the battery heating phase, the voltage $V_T$ at the common terminal T represents the flyback rail voltage of 13.5V, whereas during the temperature sensing phase, the voltage Vr at the common terminal T represents a voltage that is a function of the voltage across the temperature sensor $R_{NTC}$ for temperature sensing.

The on-time or the duty cycle DT of the transistor $M_2$ is controlled by the controller 106 based on the amount of battery heating is required, preferably in a closed loop fashion by comparing the desired or predefined temperature and the actual or current battery temperature. Generally, over one exemplary operation, the controller 106 may control the on-time of the transistor $M_2$ with a maximum duty cycle of 80% so that the transistor $M_1$ can also be initiated.

The graph 302 shows the voltage $V_{Rh}$ at the heating element $R_h$, especially during the battery heating phase 311 and the temperature sensing phase 312 over time t, especially over one exemplary operation. It can be seen that the voltage $V_{Rh}$ at the heating element $R_h$ during the battery heating phase 311 represents the flyback rail voltage of 13.5V, whereas during the temperature sensing phase 312, the voltage VRI at the heating element $R_h$ represents almost zero or a negligible voltage. This is because of the series connection of the resistors $R_h$ and $R_{NTC}$ with respect to the common terminal T, where the reference voltage 203 is applied across the series connected $R_h$ and $R_{NTC}$. Generally, the ohmic value of $R_h$ is very small compared to the ohmic value of $R_{NTC}$ (e.g. $20\Omega$ of $R_h$ vs. $2K\Omega$-$30K\Omega$ of $R_{NTC}$), and therefore the most significant voltage drop occurs across the resistor $R_{NTC}$.

The graph 303 shows the temperature sensing signal $V_{T\_measured}$ sensed or sampled by the controller 106, especially through the voltage divider network of the resistors $R_6$ and $R_7$ as described above. The point 331 corresponds to a sampling instant at which the controller 106 may take one or more samples of the temperature sensing signal. The sampling instant or instances may be timed with respect to a trailing edge of the PWM on time when the transistor $M_1$ is being turned-off and with a fixed delay or dead time d (e.g. a delay of 200 microseconds) thereafter. The controller 106 may average the sensed values over a few cycles to get a stable reading. For example, for heating power of the order of 2 W, the duty cycle of the transistor $M_2$ would be approximately 22% when supplied from a 13.5V flyback rail. The sampled voltage for temperature sensing depends on the voltage across the $R_{NTC}$ and may vary from 109 mV to 483 mV for 75° C. to 0° C., respectively.

For instance, if the battery temperature is measured as below 5° C., the controller 106 may initiate the battery heating phase 311, especially by supplying the controlled power to the heating element $R_h$, to raise the battery temperature to 5° C. and following which the battery changing may be initiated to avoid low-temperature charging phenomena. After the battery temperature is measured as about 10° C. following the initiation of the battery charging process, the controller 106 may switch-off the transistor $M_2$ and switch-on the transistor $M_1$ for a longer duration or permanently (i.e. $M_2$ with zero duty cycle) to cut-off the supply at the heating element $R_h$, where the temperature sensing operation continues. In this condition, the controller 106 may continue sampling the temperature sensing signal in an unsynchronized manner and at regular predetermined intervals.

Figure 4:
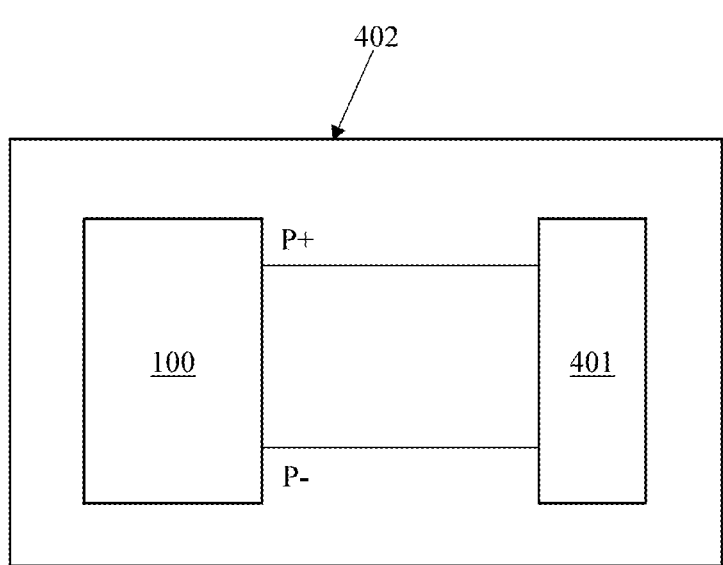
FIG. 4 shows an exemplary block representation of an emergency lighting system according to an embodiment of this disclosure.

In FIG. 4, an exemplary block representation of an emergency lighting system 400 according to an embodiment of this disclosure is illustrated. The emergency lighting system 400 may comprise the emergency driver 100, emergency lighting means 401, and a housing 402. The housing 402 may fully encompass the emergency driver 100 and the emergency lighting means 401. The housing 402 may be mountable in relation to a wall or a surface (not shown). The housing 402 may consist or be a combination of galvanized metal, polycarbonate, or glass fiber reinforced plastic.

The emergency lighting means 401 may correspond or be a LED based illuminant. The emergency lighting means 401 may be coupled to the emergency driver 100 through the post protection battery terminals P+, P− of the emergency driver 100, especially to be powered by the battery 101 of the emergency driver 100.

The emergency lighting system 400 may correspond to an emergency exit route illumination system that may help evacuees exit a residential or industrial structure in the event of an emergency such as a fire, earthquake, or the like, by providing emergency illumination around the periphery of an exit door and/or an alternative safe exit portal and/or an escape route.

Figure 5:
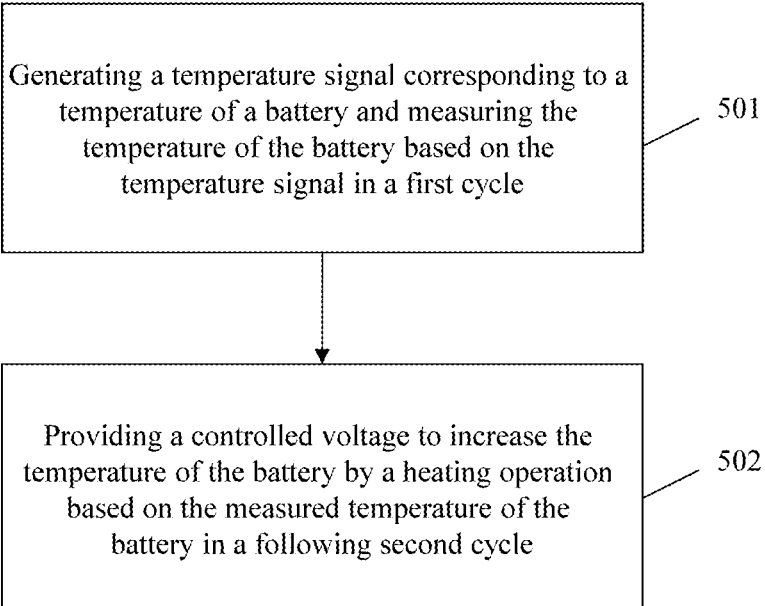
FIG. 5 shows an exemplary flow diagram of the method according to an embodiment of this disclosure.

In FIG. 5, an exemplary embodiment of the method 500 according to an embodiment of this disclosure is illustrated. In a first step 501, especially in a first cycle, a temperature signal corresponding to a temperature of a battery is generated and the temperature of the battery is measured based on the temperature signal. In a second step 502, a controlled voltage is provided in a second cycle to increase the temperature of the battery by a heating operation based on the measured temperature of the battery.

Therefore, the embodiments of this disclosure effectively reduces the conventional number of required terminals between the driver electronics and the battery PCM. The solution presented by the embodiments of this disclosure foresees a total of only three terminals or connectors that are required for transmitting the supply voltage from the battery to the emergency lighting means (via the terminals P+, P−), for sensing the battery temperature (via the time multiplexed terminal T), and for actively or electrically heating the battery (via the time multiplexed terminal T).

It is important to note that, in the description as well as in the claims, the word "comprising" does not exclude other elements or steps and the indefinite article "a" or "an" does not exclude a plurality. A single element or other unit may fulfill the functions of several entities or items recited in the claims. Furthermore, the word "coupled" implies that the elements may be directly connected together or may be coupled through one or more intervening elements. More-over, the disclosure with regard to any of the aspects is also relevant with regard to the other aspects of the disclosure.

Although the disclosure has been illustrated and described with respect to one or more implementations, equivalent alterations and modifications will occur to others skilled in the art upon the reading and understanding of this specification and the annexed drawings. In addition, while a particular feature of this disclosure may have been disclosed with respect to only one of several implementations, such feature may be combined with one or more other features of the other implementations as may be desired and advantageous for any given or particular application.

The invention claimed is:

1. An emergency driver (100) for driving emergency lighting means comprising:
   a battery (101) operably coupled to the emergency lighting means,
   a temperature sensor (104) configured to generate a temperature signal (Ts) corresponding to a temperature of the battery (101),
   at least a resistive heating element (102) configured to increase the temperature of the battery (101) by a heating operation, and
   a controller (106) configured to perform in a time multiplex manner, the reading of the temperature sensor (104) and the operation of the resistive heating element (102).

2. The emergency driver according to claim 1, wherein the controller (106) is configured to read the temperature signal (Ts) generated by the temperature sensor (104) to measure the temperature of the battery (101) in a first cycle, and further to provide a controlled voltage ($V_T$) to the resistive heating element (102) for the heating operation based on the measured temperature of the battery (101) in a following second cycle.

3. The emergency driver according to claim 2, wherein the temperature sensor (104) and the resistive heating element (102) are operably coupled to a common terminal (T), whereby the controller (106) is configured to read the temperature signal (Ts) from the common terminal (T) in the first cycle and further to provide the controlled voltage ($V_T$) to the common terminal (T) in the second cycle.

4. The emergency driver according to claim 3, wherein the temperature sensor (104) and the resistive heating element (102) are coupled along a single electrical path (201) with respect to the common terminal (T).

5. The emergency driver according to claim 1, further comprising means (202) for bypassing the temperature sensor (104), whereby the controller (106) is configured to bypass the temperature sensor (104) in the second cycle.

6. The emergency driver according to claim 1, further comprising a first switching element (M1) and a second switching element (M2), whereby the controller (106) is configured to operate the first switching element (M1) and the second switching element (M2) in a complementary manner, wherein a conduction period of the first switching element (M1) corresponds to the first cycle and a conduction period of the second switching element (M2) corresponds to the second cycle.

7. The emergency driver according to claim 6, wherein the controller is configured to operate the first switching element (M1) and the second switching element (M2) in the complementary manner with a fixed frequency.

8. The emergency driver according to claim 6, wherein the controller is configured to control the conduction period of the second switching element (M2) based on a predetermined temperature of the battery (101).

9. The emergency driver according to claim 6, wherein the first switching element (M1) and the second switching element (M2) are active switching elements.

10. The emergency driver according to claim 1, wherein the controller (106) is configured to read the temperature signal (Ts) generated by the temperature sensor (104) during the first cycle at a predetermined delay (d) in time after the initiation of the first cycle.

11. The emergency driver according to claim 1, wherein the controller (106) is configured to average the measured temperature of the battery (101) based on the temperature signal (Ts) generated by the temperature sensor (104) over a predetermined number of cycles.

12. The emergency driver according to claim 1, wherein the battery (101) is a Lithium-ion battery.

13. The emergency driver according to claim 1, wherein the temperature sensor (104) is a thermistor.

14. An emergency lighting system (400) comprising:
    the emergency driver (100) according to claim 1,
    emergency lighting means (401) operably coupled to the emergency driver (100), and
    a housing (402) encompassing the emergency driver (100) and the emergency lighting means, the housing being mountable relative to a wall or a surface.

15. The emergency driver according to claim 1 wherein the temperature sensor is a resistive temperature sensor.

16. A method (500) for a time-multiplexed resistive heating and temperature sensing of a battery for an emergency driver comprising:
    generating (501) a temperature signal corresponding to a temperature of the battery and measuring the temperature of the battery based on the temperature signal in a first cycle, and
    providing (502) a controlled voltage to increase the temperature of the battery by a heating operation based on the measured temperature of the battery in a following second cycle.

17. The method according to claim 16, wherein the method further comprising:
    reading the temperature signal from and providing the controlled voltage to a common terminal of the emergency driver.

18. The method according to claim 16 wherein a resistive temperature sensor is used to generate the temperature signal.

* * * * *